US008374968B2

(12) United States Patent
Etchegoyen

(10) Patent No.: US 8,374,968 B2
(45) Date of Patent: Feb. 12, 2013

(54) LICENSE AUDITING FOR DISTRIBUTED APPLICATIONS

(75) Inventor: Craig S. Etchegoyen, Irvine, CA (US)

(73) Assignee: Uniloc Luxembourg S.A., Luxembourg (LU)

( * ) Notice: Subject to any disclaimer, the term of this patent is extended or adjusted under 35 U.S.C. 154(b) by 535 days.

(21) Appl. No.: 12/390,273

(22) Filed: Feb. 20, 2009

(65) Prior Publication Data

US 2009/0217384 A1    Aug. 27, 2009

Related U.S. Application Data

(60) Provisional application No. 61/030,909, filed on Feb. 22, 2008.

(51) Int. Cl.
*G06F 7/04* (2006.01)
*G06F 21/00* (2006.01)
(52) U.S. Cl. .......... 705/59; 705/50; 705/51; 726/26
(58) Field of Classification Search .......... 726/26; 705/59
See application file for complete search history.

(56) References Cited

U.S. PATENT DOCUMENTS

| | | | |
|---|---|---|---|
| 4,351,982 A | 9/1982 | Miller et al. | |
| 4,658,093 A | 4/1987 | Hellman | |
| 4,704,610 A | 11/1987 | Smith et al. | |
| 4,796,220 A | 1/1989 | Wolfe | |
| 4,924,378 A * | 5/1990 | Hershey et al. | 726/29 |
| 4,937,863 A * | 6/1990 | Robert et al. | 710/200 |
| 5,138,712 A * | 8/1992 | Corbin | 726/30 |
| 5,204,897 A * | 4/1993 | Wyman | 710/200 |
| 5,210,795 A | 5/1993 | Lipner et al. | |
| 5,260,999 A * | 11/1993 | Wyman | 705/59 |
| 5,291,598 A | 3/1994 | Grundy | |
| 5,390,297 A * | 2/1995 | Barber et al. | 726/29 |
| 5,414,269 A | 5/1995 | Takahashi | |
| 5,418,854 A | 5/1995 | Kaufman et al. | |
| 5,438,508 A * | 8/1995 | Wyman | 705/1.1 |
| 5,440,635 A | 8/1995 | Bellovin et al. | |
| 5,483,658 A | 1/1996 | Grube et al. | |
| 5,490,216 A | 2/1996 | Richardson, III | |
| 5,509,070 A | 4/1996 | Schull | |
| 5,553,143 A * | 9/1996 | Ross et al. | 705/59 |
| 5,666,415 A | 9/1997 | Kaufman | |

(Continued)

FOREIGN PATENT DOCUMENTS

AU    678985    6/1997
EP    1 637 958    3/2006

(Continued)

OTHER PUBLICATIONS

SecuTech Solution Inc. "Machine Fingerprint SDK". Aug. 2006. 4 pages. http://www.eSecuTech.com.*

(Continued)

*Primary Examiner* — Calvin L Hewitt, II
*Assistant Examiner* — Nancy Loan Le
(74) *Attorney, Agent, or Firm* — Sean D. Burdick

(57) ABSTRACT

The provided software application includes a module that determines a machine fingerprint of a client device at an appropriate time, such as during initial software load on the client. The fingerprint may comprise various machine-determinable measures of system configuration for the client. Each application copy may be associated with a serial number. A license host may collect serial number, fingerprint and/or IP address information from clients on which the application is installed. The host may generate a map of application installations, including geographic locations of installations and number of unique serial numbers per client in specified regions.

23 Claims, 15 Drawing Sheets

U.S. PATENT DOCUMENTS

| | | | |
|---|---|---|---|
| 5,673,315 A * | 9/1997 | Wolf | 705/59 |
| 5,745,879 A | 4/1998 | Wyman | |
| 5,754,763 A | 5/1998 | Bereiter | |
| 5,790,664 A | 8/1998 | Coley et al. | |
| 5,925,127 A | 7/1999 | Ahmad | |
| 5,974,150 A | 10/1999 | Kaish et al. | |
| 5,983,351 A * | 11/1999 | Glogau | 726/26 |
| 6,009,401 A * | 12/1999 | Horstmann | 705/317 |
| 6,044,471 A | 3/2000 | Colvin | |
| 6,134,659 A | 10/2000 | Sprong et al. | |
| 6,158,005 A | 12/2000 | Bharathan et al. | |
| 6,230,199 B1 | 5/2001 | Revashetti et al. | |
| 6,233,567 B1 | 5/2001 | Cohen | |
| 6,243,468 B1 | 6/2001 | Pearce et al. | |
| 6,294,793 B1 | 9/2001 | Brunfeld et al. | |
| 6,330,670 B1 | 12/2001 | England et al. | |
| 6,411,941 B1 * | 6/2002 | Mullor et al. | 705/59 |
| 6,449,645 B1 | 9/2002 | Nash | |
| 6,536,005 B1 | 3/2003 | Augarten | |
| 6,697,948 B1 | 2/2004 | Rabin et al. | |
| 6,782,350 B1 | 8/2004 | Burnley et al. | |
| 6,785,825 B2 | 8/2004 | Colvin | |
| 6,859,793 B1 | 2/2005 | Lambiase | |
| 6,920,567 B1 | 7/2005 | Doherty et al. | |
| 6,976,009 B2 | 12/2005 | Tadayon et al. | |
| 6,983,262 B1 * | 1/2006 | Ito | 705/59 |
| 7,013,294 B1 * | 3/2006 | Sekigawa et al. | 705/59 |
| 7,024,696 B1 * | 4/2006 | Bahar | 726/26 |
| 7,032,110 B1 | 4/2006 | Su et al. | |
| 7,069,440 B2 | 6/2006 | Aull | |
| 7,069,595 B2 | 6/2006 | Cognigni et al. | |
| 7,085,741 B2 | 8/2006 | Lao et al. | |
| 7,131,144 B2 | 10/2006 | Rabin et al. | |
| 7,139,737 B2 * | 11/2006 | Takahashi et al. | 705/59 |
| 7,140,042 B2 * | 11/2006 | Verma | 726/26 |
| 7,188,241 B2 | 3/2007 | Cronce et al. | |
| 7,197,466 B1 * | 3/2007 | Peterson et al. | 705/59 |
| 7,203,966 B2 | 4/2007 | Abburi et al. | |
| 7,206,765 B2 | 4/2007 | Gilliam et al. | |
| 7,228,567 B2 | 6/2007 | Serkowski et al. | |
| 7,263,606 B2 * | 8/2007 | Elteto | 713/2 |
| 7,272,728 B2 | 9/2007 | Pierson et al. | |
| 7,313,828 B2 | 12/2007 | Holopainen | |
| 7,319,987 B1 | 1/2008 | Hoffman et al. | |
| 7,327,280 B2 | 2/2008 | Bachelder et al. | |
| 7,337,147 B2 | 2/2008 | Chen et al. | |
| 7,343,297 B2 | 3/2008 | Bergler et al. | |
| 7,356,709 B2 * | 4/2008 | Gunyakti et al. | 713/193 |
| 7,463,945 B2 | 12/2008 | Kiesel et al. | |
| 7,500,108 B2 * | 3/2009 | Johnson et al. | 713/187 |
| 7,644,442 B2 * | 1/2010 | Miller et al. | 726/26 |
| 7,653,899 B1 | 1/2010 | Lindahl et al. | |
| 8,181,265 B2 * | 5/2012 | Gunyakti et al. | 726/31 |
| 8,260,712 B2 * | 9/2012 | Yamamoto et al. | 705/59 |
| 2001/0034712 A1 | 10/2001 | Colvin | |
| 2001/0044782 A1 | 11/2001 | Hughes et al. | |
| 2002/0019814 A1 | 2/2002 | Ganesan | |
| 2002/0082997 A1 | 6/2002 | Kobata et al. | |
| 2002/0161718 A1 | 10/2002 | Coley et al. | |
| 2003/0065918 A1 | 4/2003 | Willey | |
| 2003/0172035 A1 | 9/2003 | Cronce et al. | |
| 2004/0024860 A1 | 2/2004 | Sato et al. | |
| 2004/0030912 A1 | 2/2004 | Merkle et al. | |
| 2004/0059929 A1 | 3/2004 | Rodgers et al. | |
| 2004/0143746 A1 | 7/2004 | Ligeti et al. | |
| 2004/0187018 A1 | 9/2004 | Owen et al. | |
| 2005/0108173 A1 | 5/2005 | Stefik et al. | |
| 2005/0138155 A1 | 6/2005 | Lewis | |
| 2005/0172280 A1 | 8/2005 | Ziegler et al. | |
| 2005/0273600 A1 | 12/2005 | Seeman | |
| 2006/0072444 A1 | 4/2006 | Engel et al. | |
| 2006/0095454 A1 | 5/2006 | Shankar et al. | |
| 2006/0161914 A1 | 7/2006 | Morrison et al. | |
| 2006/0265337 A1 | 11/2006 | Wesinger, Jr. | |
| 2006/0282511 A1 | 12/2006 | Takano et al. | |
| 2007/0150418 A1 | 6/2007 | Ben-Menahem et al. | |
| 2007/0168288 A1 | 7/2007 | Bozeman | |
| 2007/0198422 A1 | 8/2007 | Prahlad et al. | |
| 2007/0203846 A1 | 8/2007 | Kavuri et al. | |
| 2007/0219917 A1 | 9/2007 | Liu et al. | |
| 2007/0234427 A1 | 10/2007 | Gardner et al. | |
| 2007/0282615 A1 | 12/2007 | Hamilton et al. | |
| 2008/0065552 A1 | 3/2008 | Elazar et al. | |
| 2008/0086423 A1 | 4/2008 | Waites | |
| 2008/0098471 A1 | 4/2008 | Ooi et al. | |
| 2008/0147556 A1 | 6/2008 | Smith et al. | |
| 2008/0228578 A1 | 9/2008 | Mashinsky | |
| 2008/0320607 A1 | 12/2008 | Richardson | |
| 2009/0024984 A1 | 1/2009 | Maeda | |
| 2009/0083730 A1 | 3/2009 | Richardson | |
| 2009/0113088 A1 | 4/2009 | Illowsky et al. | |
| 2009/0138975 A1 | 5/2009 | Richardson | |
| 2009/0228982 A1 | 9/2009 | Kobayashi et al. | |
| 2010/0057703 A1 | 3/2010 | Brandt et al. | |

FOREIGN PATENT DOCUMENTS

| | | |
|---|---|---|
| EP | 1 637 961 | 3/2006 |
| EP | 1 670 188 A2 | 6/2006 |
| WO | 9220022 | 11/1992 |
| WO | 9301550 | 1/1993 |
| WO | 9535533 | 12/1995 |
| WO | 0067095 | 11/2000 |
| WO | 2005/104686 A2 | 11/2005 |
| WO | 2007/060516 A2 | 5/2007 |
| WO | 2008/013504 | 1/2008 |
| WO | 2008157639 | 12/2008 |
| WO | 2009039504 | 3/2009 |
| WO | 2009065135 | 5/2009 |
| WO | 2009076232 | 6/2009 |
| WO | 2009/105702 | 8/2009 |
| WO | 2009/143115 | 11/2009 |
| WO | 2009/158525 | 12/2009 |
| WO | 2010/093683 | 8/2010 |

OTHER PUBLICATIONS

Wiesen, G. "What is a Device Fingerprint?". Copyright 2003-2011 Conjecture Corporation. http://www.wisegeek.com/what-is-a-device-fingerprint.htm.*

White, Ron. How Computers Work, Millennium Ed. Que Corporation, Sep. 22, 1999.*

Murthy, Uday S. et al.. "A continous auditing web services model for XML-based accounting systems." School of Accountancy, University of South Florida, Tampa, FL 33620-5500. USA. International Journal of Accounting Information Systems 5 (2004) 139-163. http://www.sciencedirect.com/science/article/pii/S1467089504000156.*

International Search Report and Written Opinion for corresponding International Application No. PCT/US2009/034765 dated Aug. 3, 2009, total 18 pages.

Angha et al.; Securing Transportation Network Infrastructure with Patented Technology of Device Locking—Developed by Uniloc USA; http://www.dksassociates.com/admin/paperfile/ITS%20World%20Paper%20Submission_Uniloc%20_2_.pdf; Oct. 24, 2006.

Econolite; Econolite and Uniloc Partner to Bring Unmatched Infrastructure Security to Advanced Traffic Control Networks with Launch of StrongPoint; http://www.econolite.com/docs/press/20080304_Econolite_StrongPoint.pdf; Mar. 4, 2008.

Williams, "A Painless Guide to CRC Error Detection Algorithms," 33 pages, www.ross.net/crc/download/crc_v3.txt.

Luo et al. "Ariadne: An Eclipse-based System for Tracking the Originality of Source Code," *IBM Systems Journal*, 2007, vol. 46, No. 2, pp. 289-303.

Wikipedia: "Software Extension," May 28, 2009, Internet Article retrieved on Oct. 11, 2010. XP002604710.

H. Williams, et al., "Web Database Applications with PHP & MySQL", Chapter 1, "Database Applications and the Web", ISBN 0-596-00041-3, O'Reilly & Associates, Inc., Mar. 2002, avail. at: http://docstore.mik.ua/orelly/webprog/webdb/ch01_01.htm. XP002603488.

Partial International Search for corresponding International Application No. PCT/US2009/034765 dated Jun. 5, 2009, total 2 pages.

* cited by examiner

LICENSE AUDITING FOR DISTRIBUTED APPLICATIONS

CROSS-REFERENCE TO RELATED APPLICATION(S)

This application claims priority pursuant to 35 U.S.C. §119(e) to U.S. Provisional Application No. 61/030,909, entitled "LICENSE AUDITING FOR DISTRIBUTED APPLICATIONS," filed Feb. 22, 2008, which application is specifically incorporated herein, in its entirety, by reference.

BACKGROUND OF THE INVENTION

1. Field of the Invention

The present invention is directed toward systems for auditing software licenses, and more particularly, to a system that interfaces with a user's device to measure the device hardware configuration and thereby generate a device identifier used to audit software on the device.

2. Description of the Related Art

Currently, there are limited ways to audit software licenses. At the same time, software piracy continues to grow at an alarming rate, particularly in emerging economies. In response, software companies have focused primarily on making it more difficult for would-be pirates to install a given software application illegally, such as a single copy of the application on multiple machines. Still, software pirates have found ways to bypass such security measures and install unauthorized software copies on multiple machines. Accordingly, it would be desirable to provide an auditing service for reliable software license authentication and to provide software owners with a measure of how many copies of their software have been legitimately registered and/or how many copies are pirated versions.

SUMMARY OF THE INVENTION

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with auditing a license for a software running on a network device. In one embodiment, the device may include: a communication module for communicating with a server; at least one processor in operative communication with the communication module; and a memory in operative communication with the at least one processor and comprising executable code for the at least one processor.

For example, a processor of the device may collect machine parameters of the device, the collected machine parameters comprising a combination of at least one user-configurable parameter and at least one non-user-configurable parameter. A processor (e.g., the same processor involved in collecting the machine parameters and/or a different processor) may generate a device identifier for the device based at least in part on the collected machine parameters. A processor may create an audit number based at least in part on the device identifier. A processor may instruct the communication module to transmit the audit number to an audit database for storage.

In related aspects, the memory of the device may include executable code for the at least one processor to: collect a software identifier of the software running on the device; and associate the software identifier with the device identifier to generate the audit number.

In further related aspects, the at least one processor may determine a geo-location code for the device (e.g., an Internet Protocol (IP) address); and associate the geo-location code with at least one of the software identifier and the device identifier to generate the audit number.

In accordance with other aspects of the embodiments described herein, there is provided a network device adapted to facilitate auditing of a license for a software running on the device. The device may include: a communication module for communicating with an auditing server and an authentication server; at least one processor in operative communication with the communication module; and a memory in operative communication with the at least one processor and comprising executable code for the at least one processor.

For example, a processor of the device may collect machine parameters of the device, the collected machine parameters comprising a combination of at least one user-configurable parameter and at least one non-user-configurable parameter. A processor may instruct the communication module to send the collected machine parameters to the auditing server to generate a device identifier for the device based at least in part on the collected machine parameters. A processor may, in response to receiving the device identifier from the server, create an audit number based at least in part on the device identifier. A processor may instruct the communication module to transmit the audit number to at least one of the auditing server and the authentication server for storage in at least one audit database.

In related aspects, the memory may include executable code for the at least one processor to: collect a software identifier of the software running on the device; and associate the software identifier with the device identifier to generate the audit number. In the alternative, or in addition, the memory may include executable code for the at least one processor to: collect a software identifier of the software running on the network device; and instruct the communication module to send the software identifier to the auditing server to generate the device identifier based at least in part on the software identifier.

In further related aspects, the at least one processor may determine a geo-location code for the device; and associate the code with at least one of the device identifier and the software identifier to generate the audit number. In the alternative, or in addition, the at least one processor may send the code to the auditing server to generate the device identifier based at least in part on the code.

In accordance with other aspects of the embodiments described herein, there is provided a system for managing a license for a software running on one or more network devices. The system may include a communication module for accessing an audit database, the database comprising audit numbers for the one or more network devices, each audit number comprising a software identifier associated with a device identifier. The system may include: a display module; at least one processor in operative communication with the communication module, and the display module; and a memory in operative communication with the at least one processor and comprising executable code for the at least one processor.

For example, a processor of the system may (a) instruct the communication module to access the database and (b) process the audit numbers to, for example, sort the audit numbers according to at least one of activated license seats and unactivated license seats. A processor may select a display scheme for presenting the processed audit numbers, and instruct the display module to present the processed audit numbers according to the selected display scheme. In one approach, the processor may select the display scheme in response to a user choice entered on a user input module in operative communication with the at least one processor.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

The present invention addresses the need for an auditing service that provides reliable software license authentication and provides software owners with a measure of how many copies of their software have been legitimately registered and/or are pirated. Such an auditing service may be used alone, or in conjunction with other security/authentication measures.

Figure 1A:
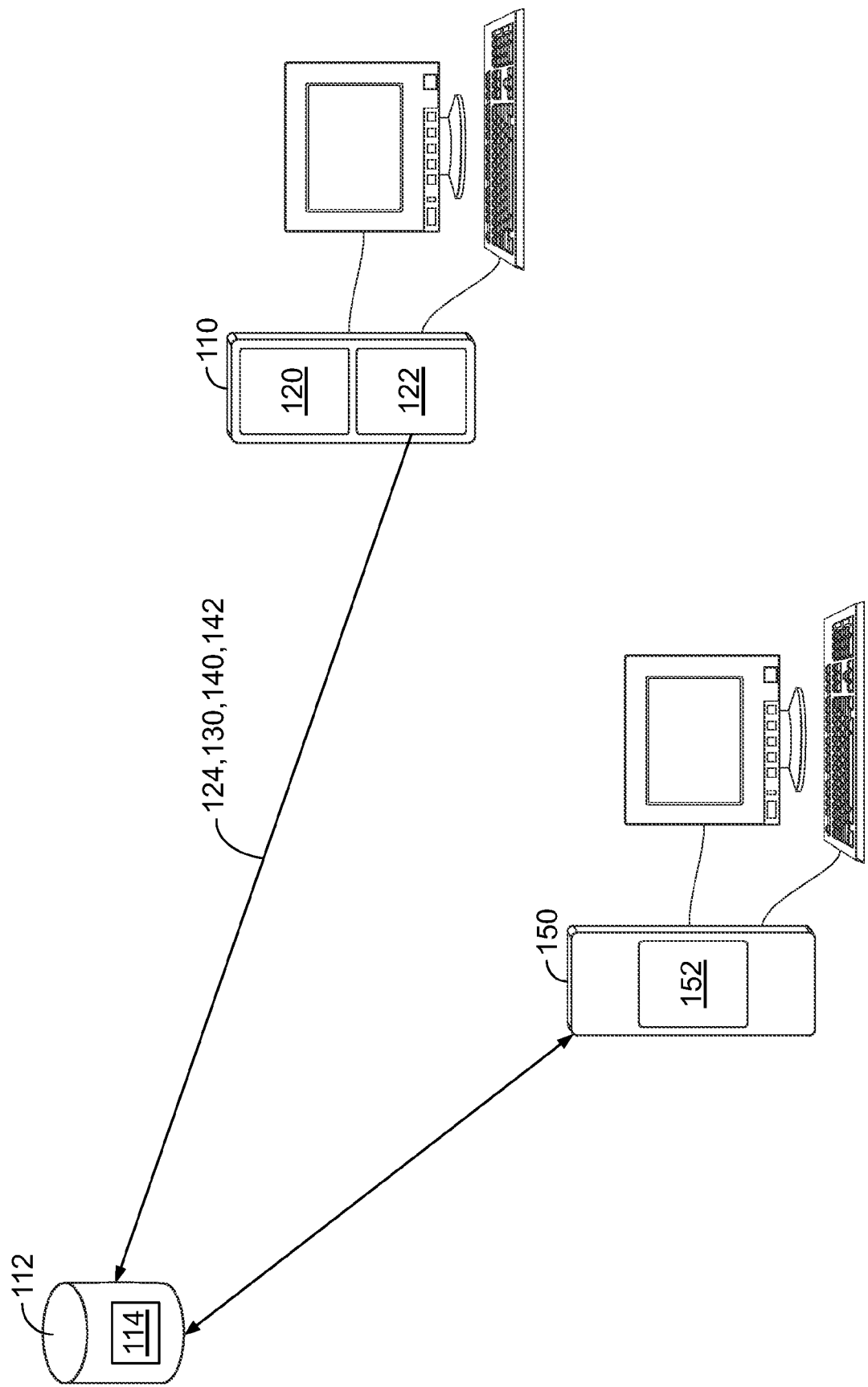
FIG. 1A provides a block diagram of an exemplary system for auditing distributed software.
Figure 1B:
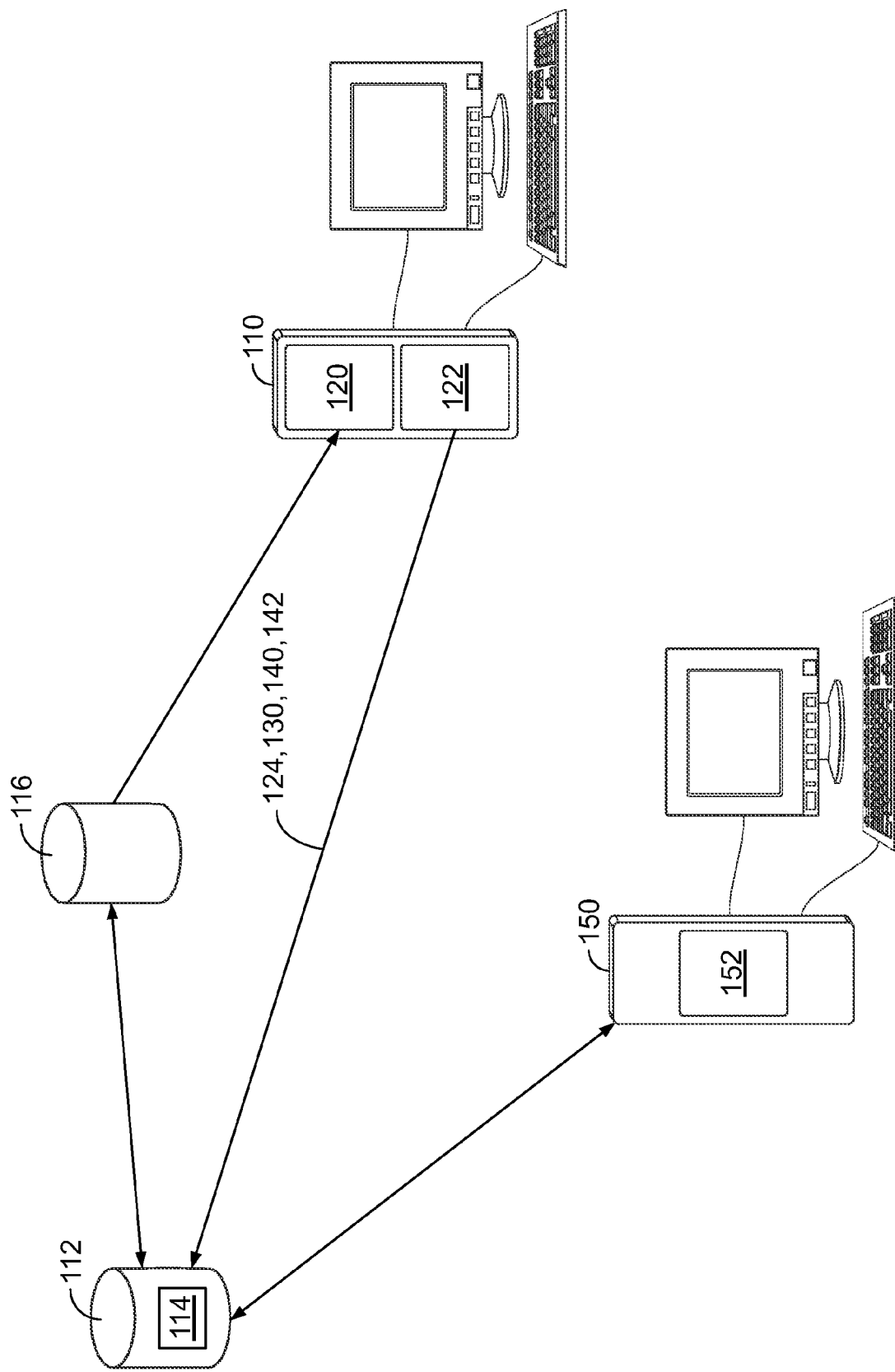
FIG. 1B provides a block diagram of another exemplary system for auditing distributed software, wherein the system includes an authentication server.

The present technology provides for an improved system and method for auditing distributed software. In accordance with one aspect of the present technology, there is provided a system and method for authenticating software licenses. With reference to FIG. 1A, there is provided an embodiment of a system having a plurality of network devices 110 that are in operative communication with an auditing server 112. While only one network device 110 is illustrated in FIGS. 1A-1B, it will be understood that a given system may comprise any number of network devices. The network device 110 may be, but is not limited to, a personal computer, a server computer, a laptop computer, a tablet computer, a personal digital assistant, a mobile phone, a wireless communication device, an onboard vehicle computer, or any other device capable of communication with a computer network.

The network device 110 may comprise a software 120 that requires a license to be authorized for use. The device 110 may also comprise an auditing tool or application 122. The auditing application 122 may be any program or application that collects identifying information regarding the network device 110 and/or any software (e.g., software 120) on the network device 110. The auditing application 122 may comprise a stand alone application or an applet running within a web browser on the device 110 (e.g., an applet comprising executable code for a Java Virtual Machine). The auditing application 122 may be embedded in or associated with another software application, including but not limited to software 120. For example, the auditing application 122 may be embedded in or associated with a tool bar of a software application, such as, for example, a web browser. The auditing application 122 may prompt the user to register with an online software registration service, or may run in the background with little or no interaction with the user of device 110.

The auditing application 122 may include a registration routine that collects information regarding network device 110 by checking a number of parameters which are expected to be unique to the network device environment. The parameters checked may include, for example, hard disk volume name, user name, device name, user password, hard disc initialization date, etc. The collected information may include information that identifies the hardware comprising the platform on which the web browser runs, such as, for example, CPU number, or unique parameters associated with the firmware in use. The system information may further include system configuration information, such as amount of memory, type of processor, software or operating system serial number, etc.

Based on the collected information, the auditing application 122 may generate a device identifier 124 that is unique for the user computer 110. In the alternative, or in addition, the application 122 may gather and send the device parameters to a remote server, such as auditing server 112, which in turn generates the device identifier 124. The device identifier 124 may be stored in a hidden directory of the device 110 and/or at a remote location, such as the auditing server 112. The device identifier 124 may incorporate the device's IP address and/or other geo-location code to add another layer of specificity to device's unique identifier.

It is noted that an application (e.g., auditing application 122) running on the network device or otherwise having access to the network device's hardware and file system may generate a unique device identifier (e.g., device identifier 124) using a process that operates on data indicative of the network device's configuration and hardware. The device identifier may be generated using a combination of user-configurable and non-user-configurable machine parameters as input to a process that results in the device identifier, which may be expressed in digital data as a binary number. Each machine parameter is data determined by a hardware component, software component, or data component specific to the device that the unique identifier pertains to. Machine parameters may be selected based on the target device system configuration such that the resulting device identifier has a very high probability (e.g., greater than 99.999%) of being unique to the target device. In addition, the machine parameters may be selected such that the device identifier includes at least a stable unique portion up to and including the entire identifier, that has a very high probability of remaining unchanged during normal operation of the target device. Thus, the resulting device identifier should be highly specific, unique, reproducible and stable as a result of properly selecting the machine parameters.

The application for generating the device identifier may also operate on the collected parameters with one or more algorithms to generate the device identifier. This process may include at least one irreversible transformation, such as, for example, a cryptographic hash function, such that the input machine parameters cannot be derived from the resulting device identifier. Each device identifier, to a very high degree of certainty, cannot be generated except by the suitably configured application operating or otherwise having had access to the same field security device for which the device identifier was first generated. Conversely, each identifier, again to a very high degree of certainty, can be successfully reproduced by the suitably configured application operating or otherwise having access to the same field security device on which the identifier was first generated.

The application may operate by performing a system scan to determine a present configuration of the field security device. The application may then select the machine parameters to be used as input for generating the unique device identifier. Selection of parameters may vary depending on the system configuration. Once the parameters are selected, the application may generate the identifier.

Further, generating the device identifier may also be described as generating a device fingerprint and may entail the sampling of physical, non-user configurable properties as well as a variety of additional parameters such as uniquely generated hashes and time sensitive values. Physical device parameters available for sampling may include, for example, unique manufacturer characteristics, carbon and silicone degradation and small device failures.

The process of measuring carbon and silicone degradation may be accomplished by measuring a chip's ability to process complex mathematical computations, and its ability to respond to intensive time variable computations. These processes measure how fast electricity travels through the carbon. Using variable offsets to compensate for factors such as heat and additional stresses placed on a chip during the sampling process allows for each and every benchmark to reproduce the expected values. During a standard operating lifetime, the process of passing electricity through the various switches causes a computer chip to degrade. These degradations manifest as gradually slower speeds that extend the processing time required to compute various benchmarking algorithms.

In addition to the chip benchmarking and degradation measurements, the process for generating a device identifier may include measuring physical, non-user-configurable characteristics of disk drives and solid state memory devices. Each data storage device has a large variety of damage and unusable data sectors that are nearly unique to each physical unit. The ability to measure and compare values for damaged sectors and data storage failures provides a method for identifying storage devices.

Device parameter sampling, damage measurement and chip benchmarking make up just a part of device fingerprinting technologies described herein. These tools may be further extended by the use of complex encryption algorithms to convolute the device identifier values during transmission and comparisons. Such encryption processes may be used in conjunction with random sampling and key generations.

The device identifier may be generated by utilizing machine parameters associated with one or more of the following: machine model; machine serial number; machine copyright; machine ROM version; machine bus speed; machine details; machine manufacturer; machine ROM release date; machine ROM size; machine UUID; and machine service tag.

The device identifier may also be generated by utilizing machine parameters associated with one or more of the following: CPU ID; CPU model; CPU details; CPU actual speed; CPU family; CPU manufacturer; CPU voltage; and CPU external clock.

The device identifier may also be generated by utilizing machine parameters associated with one or more of the following: memory model; memory slots; memory total; and memory details.

The device identifier may also be generated by utilizing machine parameters associated with one or more of the following: video model; video details; display model; display details; audio model; and audio details.

The device identifier may also be generated by utilizing machine parameters associated with one or more of the following: network model; network address; Bluetooth address; Blackbox model (including IDE and SCSI); Blackbox serial; Blackbox details; Blackbox damage map; Blackbox volume name; NetStore details; and NetStore volume name.

The device identifier may also be generated by utilizing machine parameters associated with one or more of the following: optical model; optical serial; optical details; keyboard model; keyboard details; mouse model; mouse details; printer details; and scanner details.

The device identifier may also be generated by utilizing machine parameters associated with one or more of the following: baseboard manufacturer; baseboard product name; baseboard version; baseboard serial number; and baseboard asset tag.

The device identifier may also be generated by utilizing machine parameters associated with one or more of the following: chassis manufacturer; chassis type; chassis version; and chassis serial number.

The device identifier may also be generated by utilizing machine parameters associated with one or more of the following: IDE controller; SATA controller; RAID controller; and SCSI controller.

The device identifier may also be generated by utilizing machine parameters associated with one or more of the following: port connector designator; port connector type; port connector port type; and system slot type.

The device identifier may also be generated by utilizing machine parameters associated with one or more of the following: cache level; cache size; cache max size; cache SRAM type; and cache error correction type.

The device identifier may also be generated by utilizing machine parameters associated with one or more of the following: fan; PCMCIA; modem; portable battery; tape drive; USB controller; and USB hub.

The device identifier may also be generated by utilizing machine parameters associated with one or more of the following: device model; device model IMEI; device model IMSI; and device model LCD.

The device identifier may also be generated by utilizing machine parameters associated with one or more of the following: wireless 802.11; webcam; game controller; silicone serial; and PCI controller.

Figure 2:
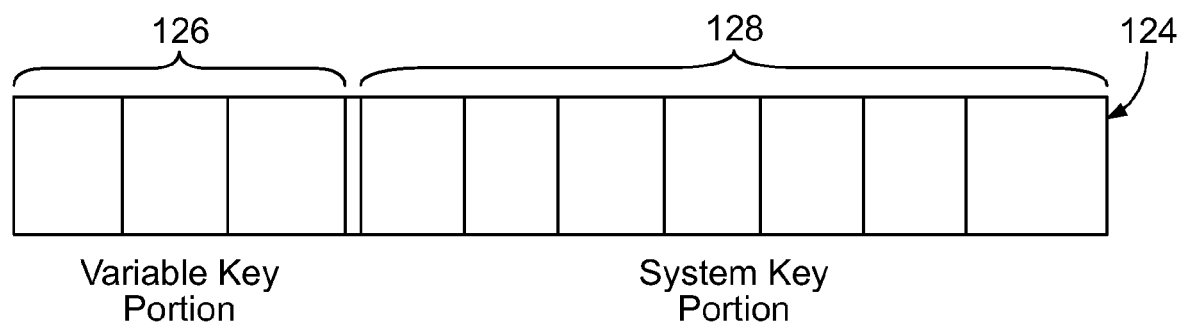
FIG. 2 illustrates the components of an exemplary device identifier.

With reference to FIG. 2, in one embodiment, the device identifier 124 may include two components—namely, a variable key portion 126 and a system key portion 128. The variable key portion 126 may be generated at the time of registration of network device 110 by reference to a variable platform parameter, such as via reference to system time information, although other parameters which are variable may be utilized in other embodiments. The system key portion 128 may include the above described parameters expected to be unique to the device 110, such as, for example, hard disk volume name, user name, computer name, user password, hard disc initialization date, or combinations thereof Portions 126 and/or 128 may be combined with the IP address and/or other platform parameters of the device 110. Further details regarding device identifiers 124, such as machine fingerprints and parameters expected to be unique for the a given computer, can be found in U.S. application Ser. No. 08/124,718, filed Sep. 21, 1993, titled "System for Software Registration," now issued as U.S. Pat. No. 5,490,216, which application is specifically incorporated herein, in its entirety, by reference. It is noted that device identifiers, or portions thereof, may be encrypted to add an additional layer of specificity and security.

With reference once again to FIG. 1A, the auditing application 122 may also include a registration routine that collects or receives information regarding the software 120 on device 110 by checking information which is expected to be unique to software 120, such as, for example, the software serial number. The collected software identifier may include the software serial number, product identification number, product key, etc. The collected software identifier may include information regarding where the software was sold or distributed, who the buyers, sellers, and/or distributors were, which stores the software was sold in, etc. It is noted that the software identifier may be unique to particular copy of software, such as when the software is licensed to a single user In the alternative, or in addition, the software identifier may be unique to particular type or group of a software, such as when the software is licensed to a defined group of users.

The embodiments described herein comprise an auditing application 122 that collects the software identifier 130 for software 120; however, it will be understood that the systems and components described herein can be adapted to collect one or more types of software identifiers for a plurality of software applications. The software identifier 130 may be stored in a hidden directory of the device 110 and/or at a remote location, such as the auditing server 112.

The auditing application 122 may also include a registration routine that collects or receives information regarding the geo-location code 140 of the device 110. The geo-locater 140 may comprise the IP address or the like of the device 110.

Auditing application 122 may electronically send the device identifier 124 and the software identifier 130 to the auditing server 112. In the alternative, or in addition, a geo-location code 140, such as the IP address of the device 110, may be associated with the device identifier 124 and/or the software identifier 130 and may sent to the auditing server 112, such as via a secured network connection. The auditing server 112 may encrypt and store the data, such as the device identifier 124, the software identifier 130, and/or the geo-location code 140, received from the network device 110. The auditing server 112 may receive such data from a plurality of network devices and store the received data in an audit database 114.

In one embodiment, the auditing application 122 may generate an audit number 142 by associating the software identifier 130 with the device identifier 124 and/or geo-location code 140, and may send the generated audit number 142 to the auditing server 112. In another embodiment, the application 122 may send the device identifier 124, the software identifier 130, and/or the geo-location code 140 to the server 112 in a piecemeal manner. The server 112 may in turn generate the audit number 142. The auditing server 112 may receive or generate audit numbers from a plurality of network devices and store the received audit numbers in the audit database 114.

It is noted that the audit number 142 may be generated from the device identifier 124, the software identifier 130, and/or the geo-location code 140 via any number of suitable approaches. For example, the software identifier 130 may be concatenated or linked with the device identifier 124 and/or geo-location code 140. It is also noted that the audit number 142 may be stored in a hidden directory of the device 110 and/or at a remote location, such as the auditing server 112. It is further noted that the device identifier 124, the software identifier 130, and/or the geo-location code 140 may at a later time be extracted from the audit number 142.

When a user of a network device, including but not limited to network device 110, installed with auditing application 122, attempts to run the software 120, the auditing application 122 in response may transmit the software identifier 130 associated with the device identifier 124 and/or the geo-location code 140 (or an audit number 142 generated from such data) to the auditing server 112, which in turn may store the received data in the audit database 114.

With reference to FIG. 1B, there is provided an embodiment of a system that further comprises an optional authentication server 116 that is in operative communication with the auditing server 112. When a given user tries to run software 120 on his/her network device, the authentication server 116 may access the audit database 114 on auditing server 112 to determine whether to allow his/her of the software 120. The authentication server 116 may receive/access the license terms for a particular software from the auditing server 112 or another server or network device.

In one embodiment, the authentication server 116 may disallow use of the software 120 beyond a defined maximum number of allowed users or seats (which may be defined by the software license). The server 116 may analyze the data in the audit database 114 and determine how many seats are currently utilizing software 120. If the number of currently allowed seats meets or exceeds the maximum number of allowed seats, the server 116 may throttle or disallow the use of software 120 by more seats; otherwise, the server may allow the use of the software 120. In another embodiment, the authentication server 116 may throttle or disallow use of the software 120 if its software identifier is already associated with a different device identifier and/or a different IP address in the audit database 114; otherwise, the server 116 may allow use of the software 120. The authentication server 116 may collect data regarding the instances of allowed and disallowed software use, and may share such data with the auditing server 112.

With reference to the embodiments of FIGS. 1A and 1B, the auditing server 112 may be in operative communication with a management device 150, which may be any device capable of communication with a computer network, such as, for example, a personal computer, a server computer, a laptop computer, a tablet computer, a personal digital assistant, a mobile phone, or a wireless communication device. The management device 150 may comprise a management application 152, which may be any program or application, such as a stand alone application or an application that is embedded or associated with another software application, such as an applet running within a web browser on the device 150.

The management application 152 may be adapted to allow a user, such as, for example, a software manufacturer or distributor, to view the data collected and stored in the audit database 114 of the audit server 112. The present embodiment will be described in the context of a software manufacturer utilizing the management application 152. However, it will be understood that any user of the management device may utilize the management application 152.

The management application 152 may present the data in the audit database 114 in a manner that allows its user to better understand how its software is being used, legitimately or otherwise. The information organized and presented according to one or more display schemes of the application 152 may allow a software manufacturer to better understand software consumer behaviors and habits, which in turn may allow the manufacturers to adjust or modify their licensing rules to comport with their business goals.

The management application 152 may be adapted to process and/or present at least a subset of the data in the audit database 114 according to one or more display schemes. The display schemes may be predefined or presented for selection by the software manufacturer. The data in the audit database 114 (i.e., the audit numbers 142 and components thereof for network devices 110) may be organized or sorted by the number of activated/unactivated seats, license seat trends, activations trends, piracy curves, etc., as shown in FIGS. 3-12. It is noted that the data in the audit database 114 may be organized, processed, and processed by the management device 152 and/or the auditing server 112.

Figure 3:
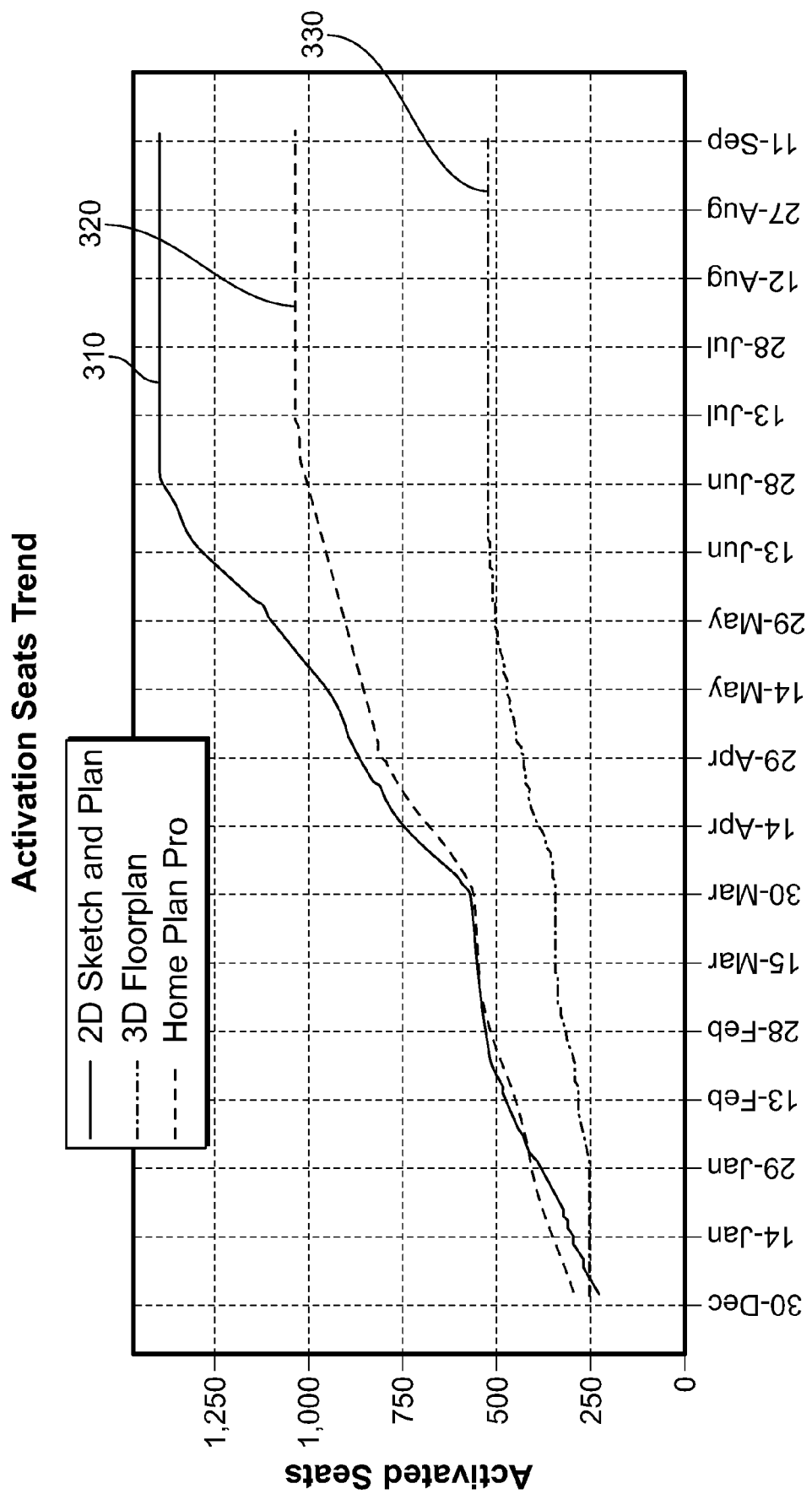
FIGS. 3-12 illustrate exemplary display schemes for presenting data from the audit database regarding one or more network devices running a given software.

The exemplary display scheme of FIG. 3 provides an activation seats trend, which shows the number of activated seats over a period of time for three types of software 310, 320, and 330 (e.g., corresponding to "2D Sketch and Plan," "3D Floorplan" and "Home Plan Pro," respectively). The data presented according to the display scheme of FIG. 3 may allow one to determine licensing trends and correlate marketing and sales efforts to activation events.

Figure 4:
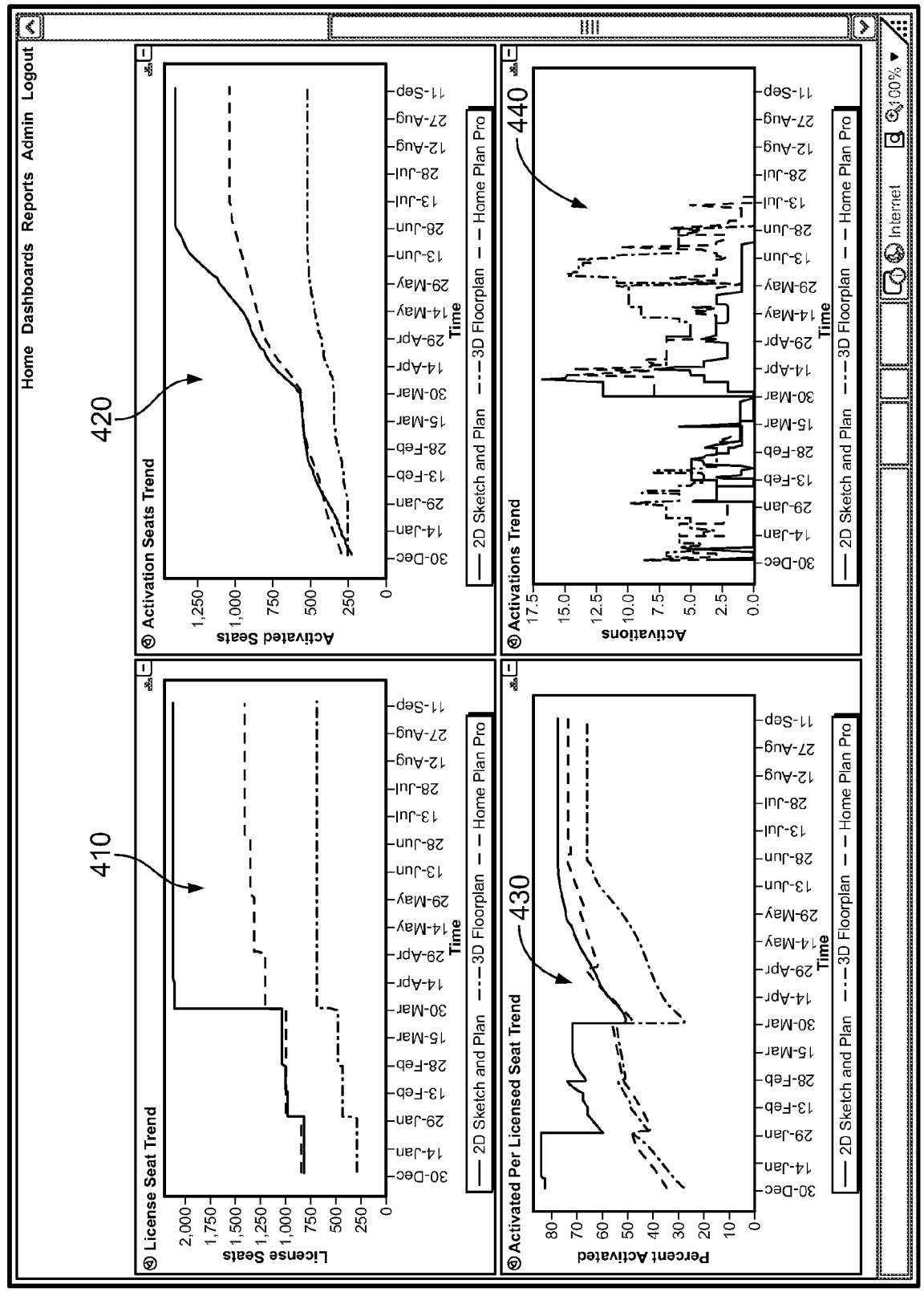

The exemplary display scheme of FIG. 4 provides the license seat trend 410, the activation seats trend 420, the activated-per-licensed-seat trend 430, and the activations trend 440 for three types of software (e.g., 310, 320, 330 in FIG. 3).

Figure 5:
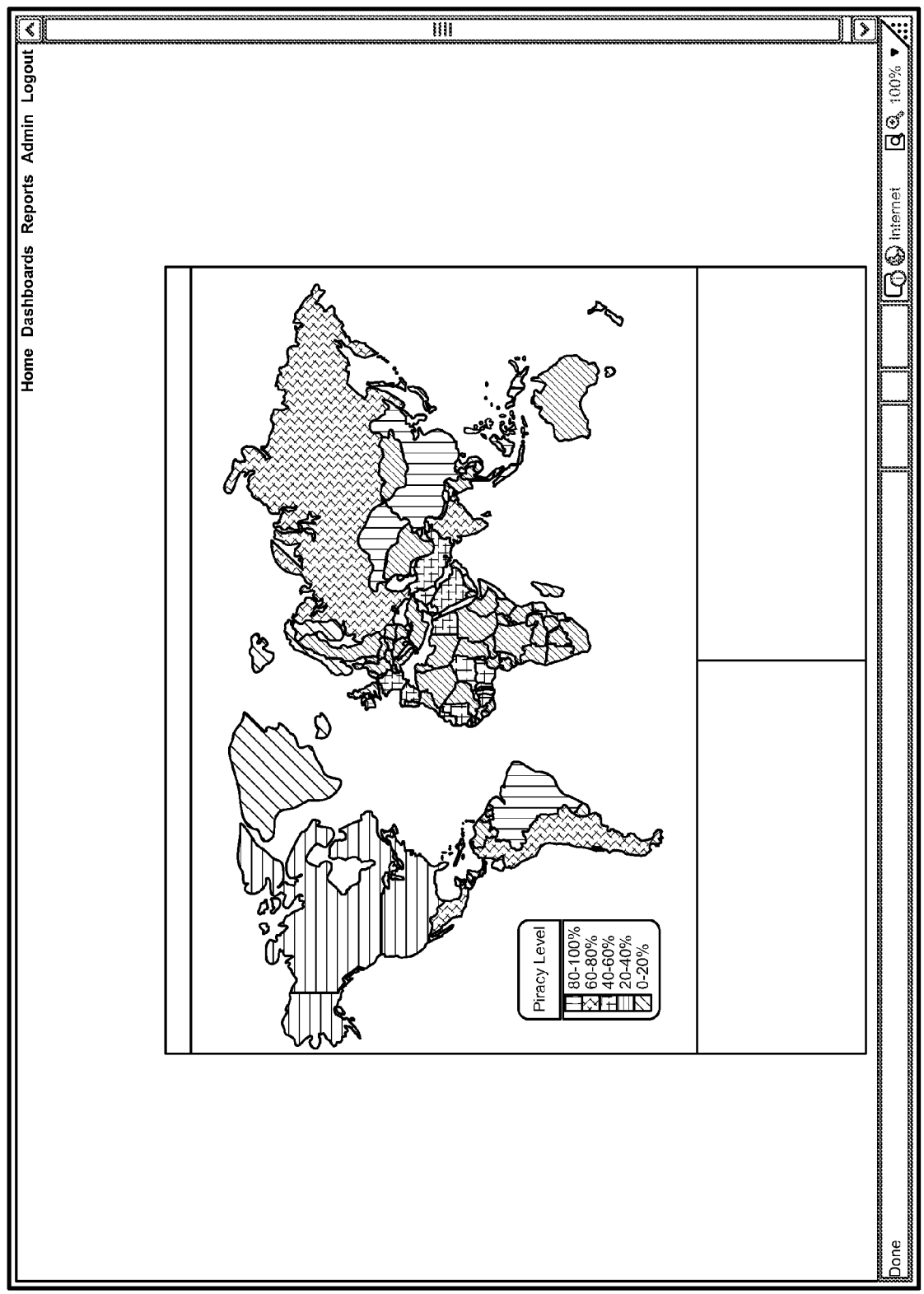

The exemplary display scheme of FIG. 5 provides a piracy heat map which may allow one to visualize the extent/level of piracy in different geographic regions. It is noted that such piracy heat maps and other geographically based summaries may be based at least in part on the geo-location codes associated with the corresponding software identifiers. The data presented on the piracy heat map may be filtered by piracy, activations, number of seats or licenses sold, etc. The display scheme may further comprise a pivot table or the like to supplement the piracy heat map.

Figure 6:
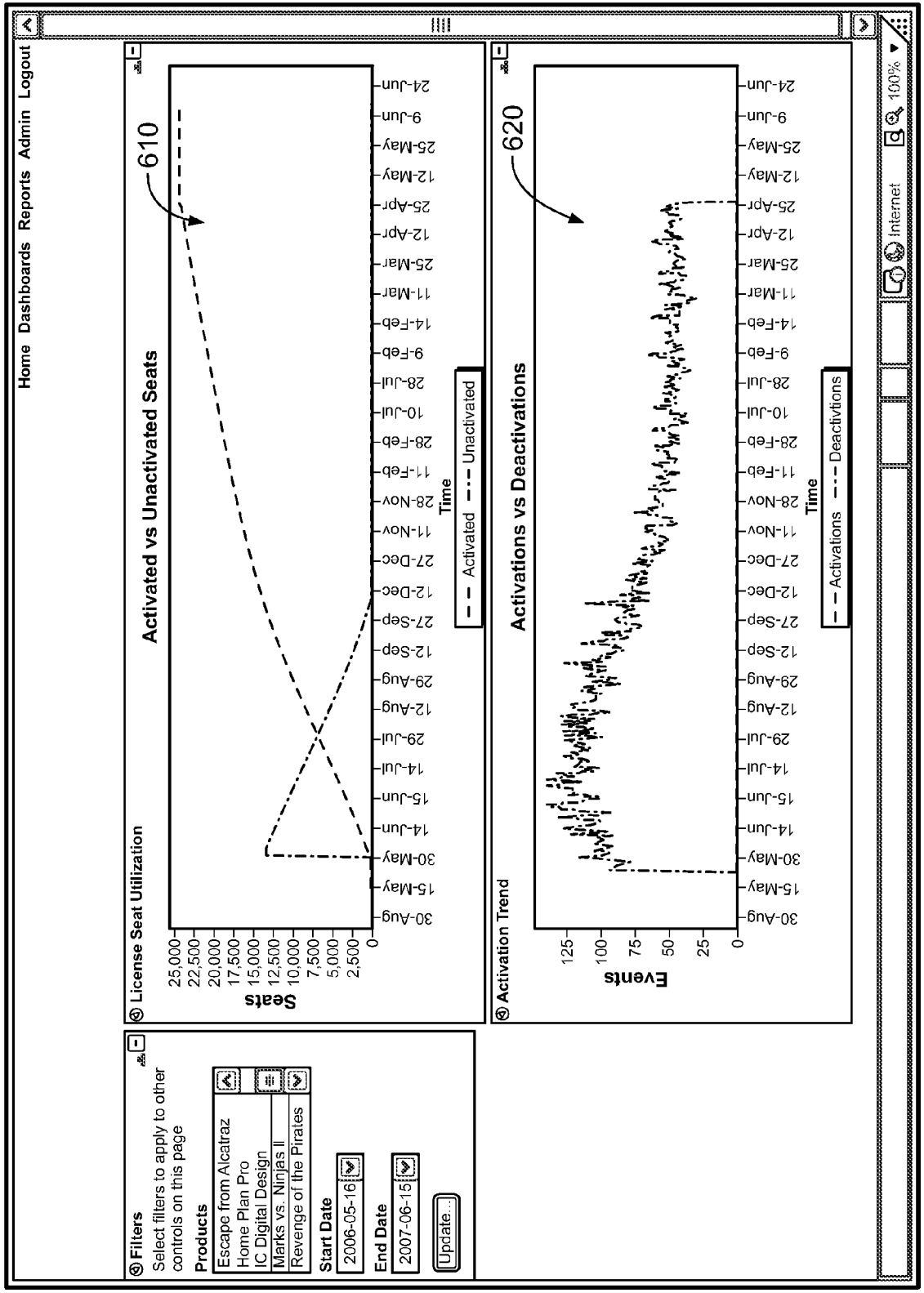
Figure 7:
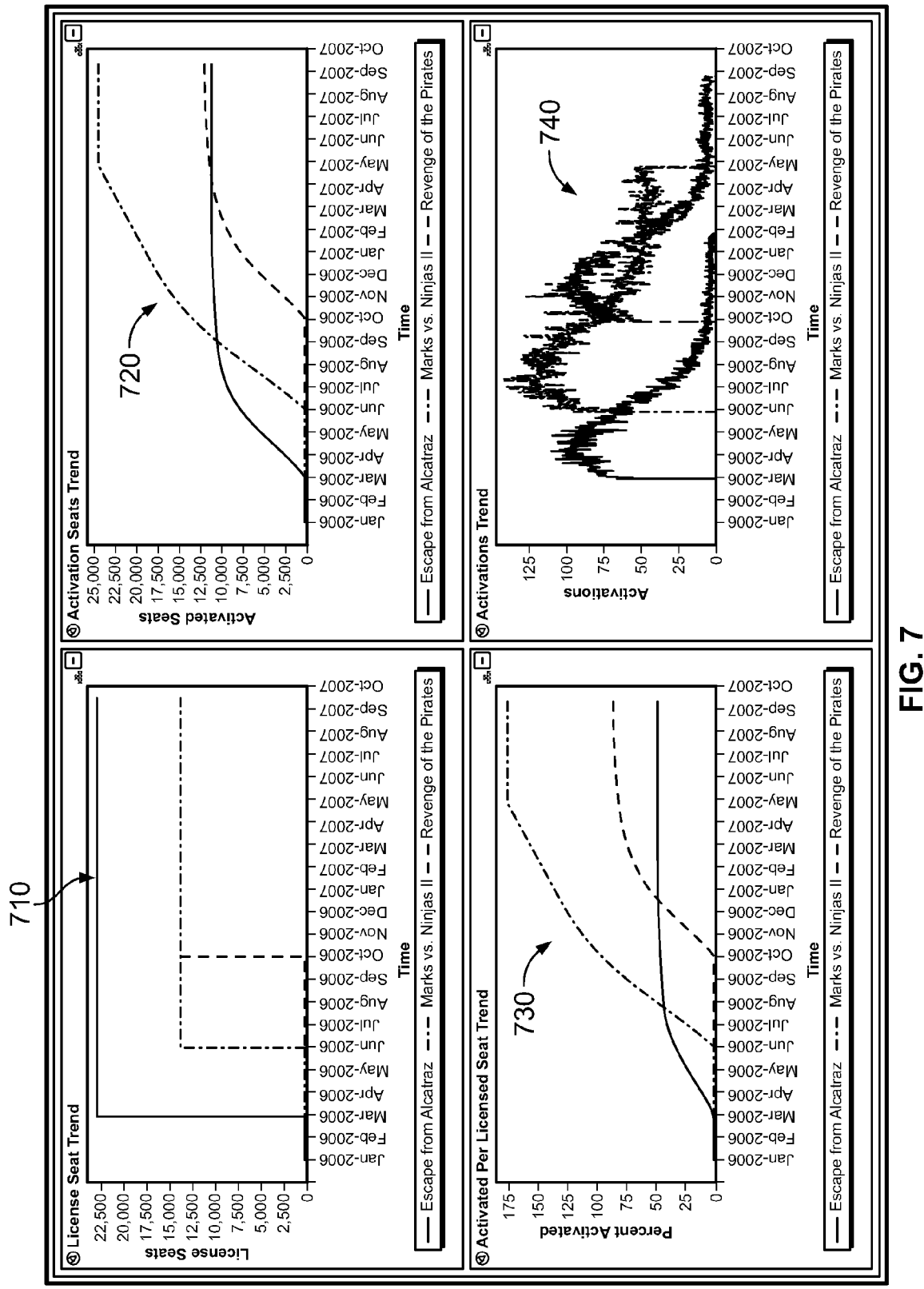

The exemplary display scheme of FIG. 6 presents the license seat utilization (activated vs. deactivated seats) summary 610 and the activation trend (activations vs. deactivations) summary 620. The exemplary display scheme of FIG. 7 presents the license seat trend 710, the activation seats trend 720, the activated-per-licensed-seat trend 730, and the activation trend 740 for three types of software (e.g., "Escape from Alcatraz," "Marks vs. Ninjas II" and "Revenge of the Pirates").

Figure 8:
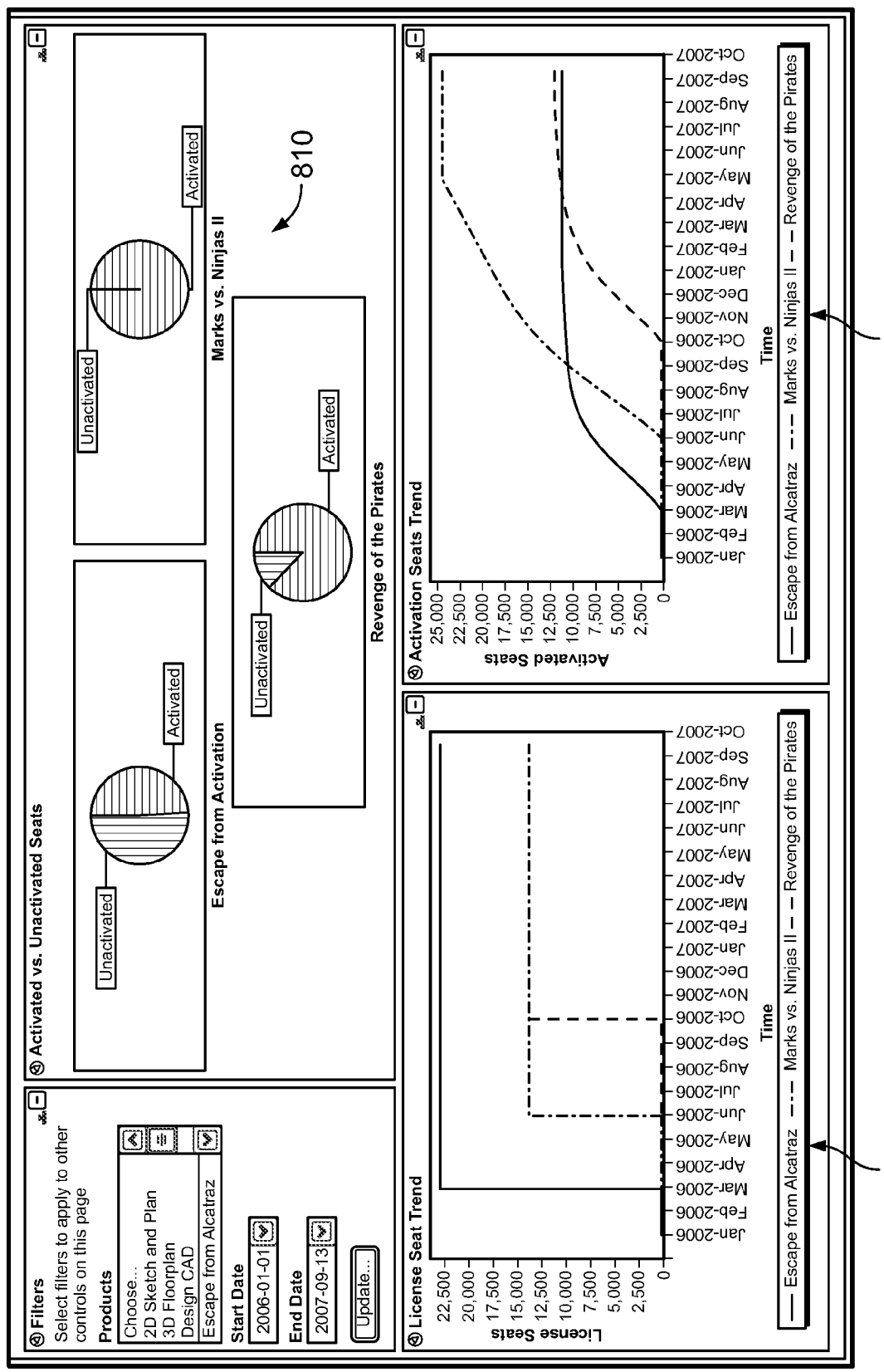
Figure 9:
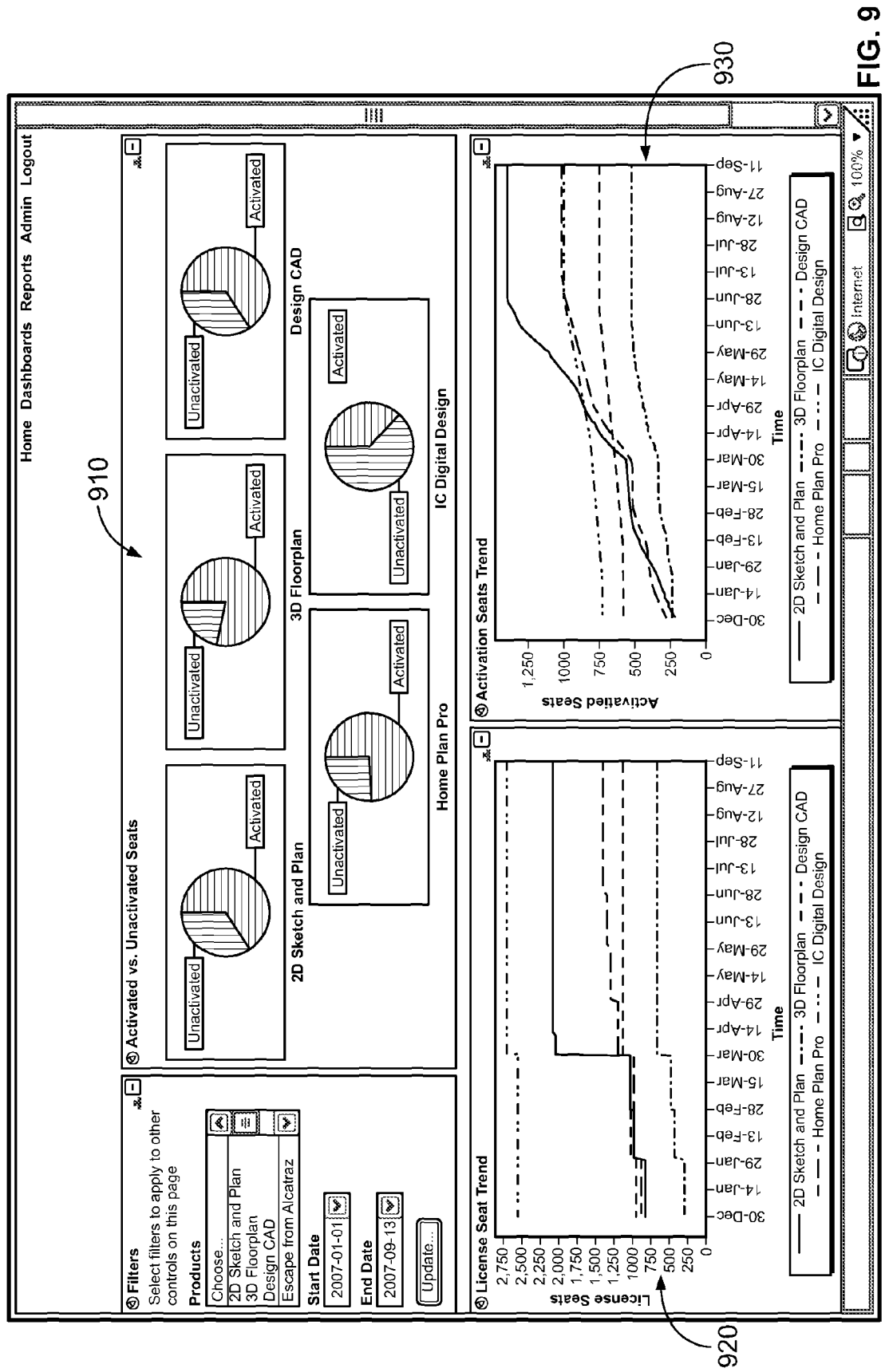

The exemplary display scheme of FIG. 8 presents activated-versus-unactivated pie charts 810, the licensee seat trend 820, and the activation seats trend 830. Similarly, the exemplary display scheme of FIG. 9 presents activated-versus-unactivated pie charts 910, the licensee seat trend 920, and the activation seats trend 930 for five types of software (e.g., "2D Sketch and Plan," "3D Floorplan," "Design CAD," "Home Plan Pro" and "IC Digital Design"). The presentation of data according to the display schemes of FIGS. 8 and 9 may make it possible to identify accounts that are at or above their licensed seats. In addition, the data presented in FIGS. 8 and 9 make it possible to identify licenses that are not being utilized and to properly allocate resources to ensure continued revenue streams.

Figure 10:
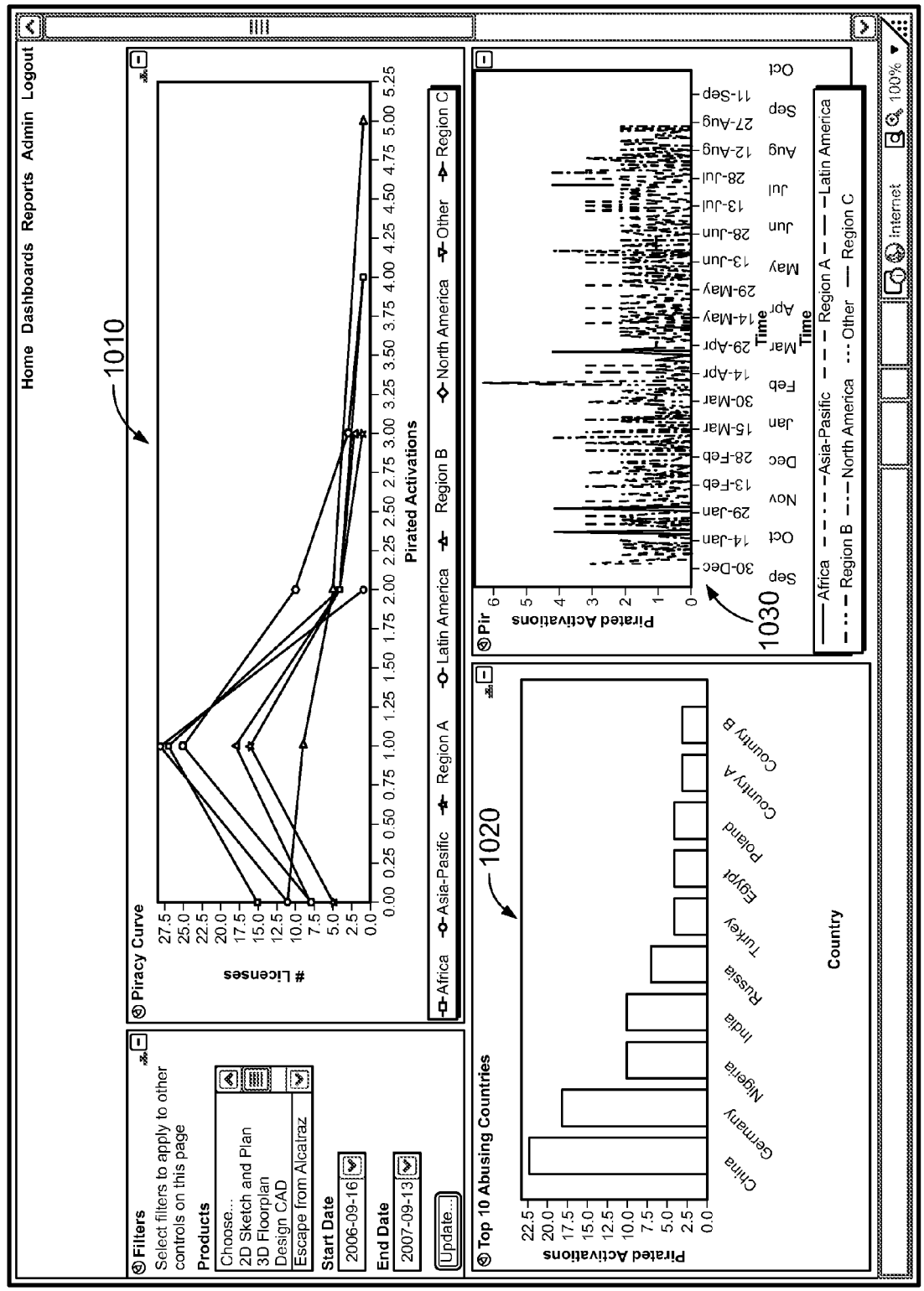

The exemplary display scheme of FIG. 10 presents piracy curves 1010, the top ten abusing countries summary 1020, and the pirated activations summary 1030. It is again noted that such geographically based summaries may be based at least in part on the geo-location codes associated with the corresponding software identifiers.

Figure 11:
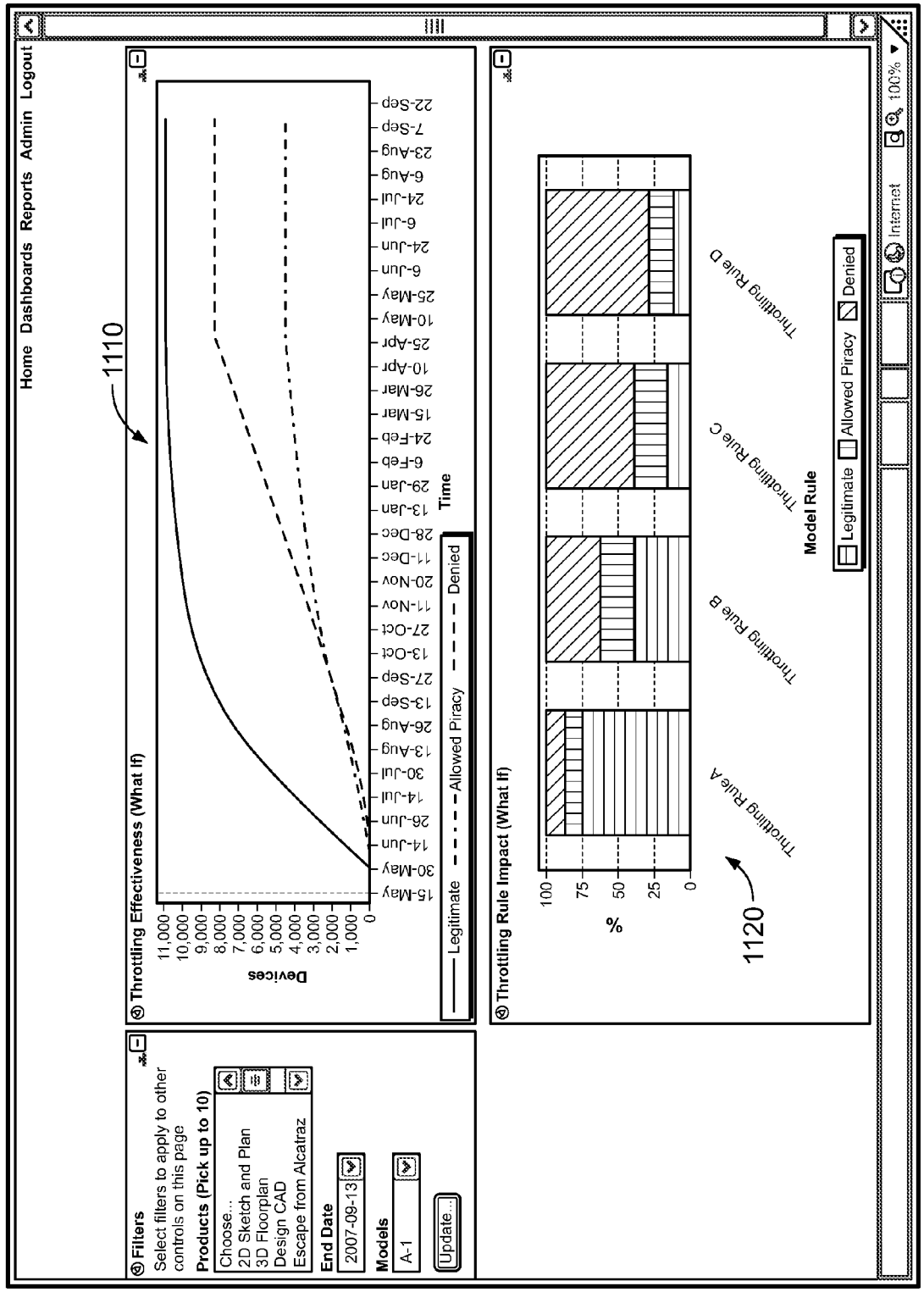
Figure 12:
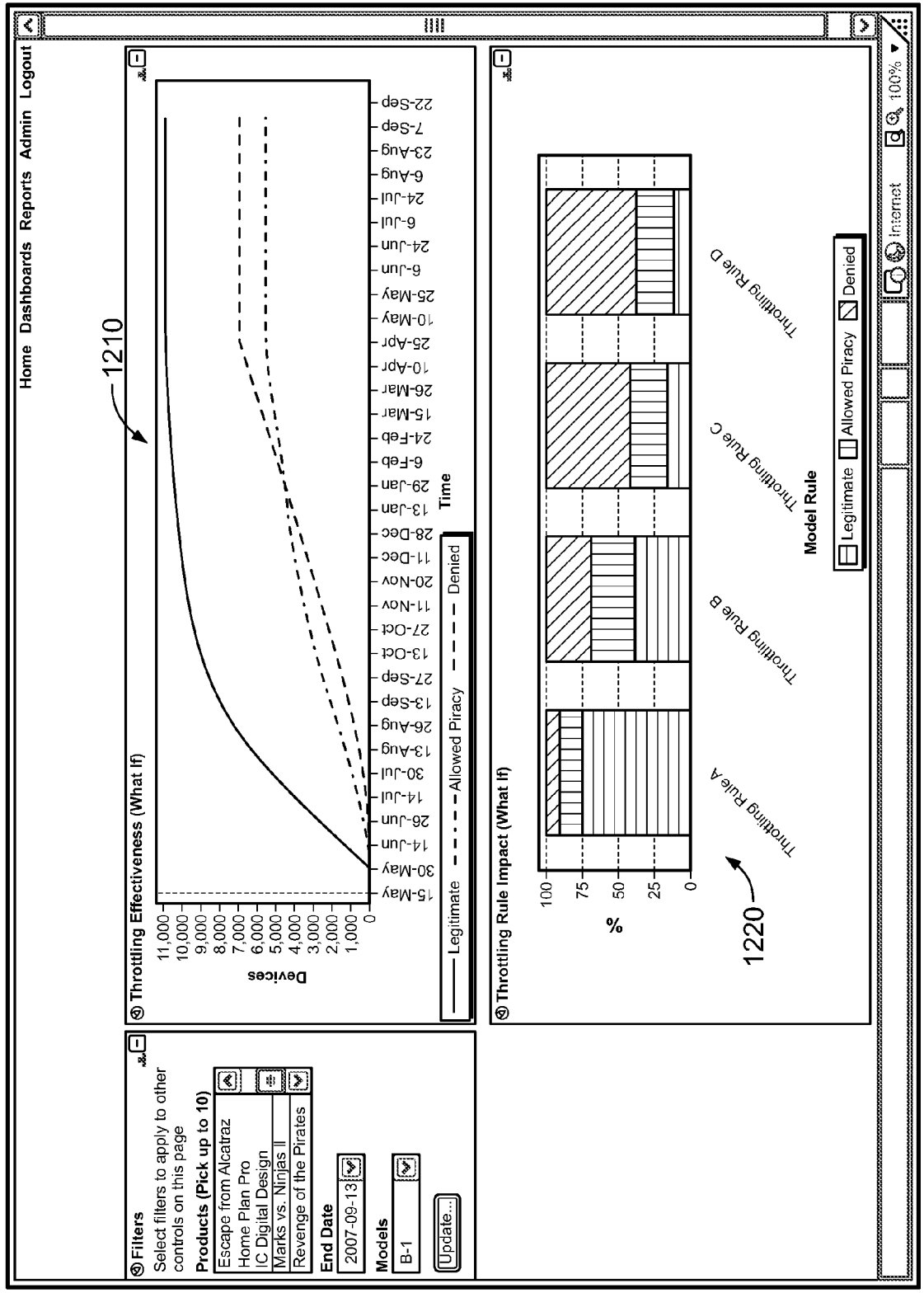

It is noted that the data in the audit database 114 may be used to model or simulate the effect of certain actions taken by the software manufacturer. The information generated by such licensing models or simulators may also be based in part on other trends/data. For example, the models may be based in part on historical, current, and/or forecast trends/data associated with a particular software identifier. Similarly, the models may be based in part on trends/data associated with a particular class or types of software and/or trends/data for the software industry. The models may be based in part on trends/data associated with other industries, such as, for example, the hardware industry. For example, the management application 152 may simulate the effect of throttling or disallowing the further use of a given software. The exemplary display scheme of FIG. 11 summarizes the effect of such throttling by displaying the throttling-effectiveness summary 1110 and the throttling-rule-impact summary 1120. Similarly, the exemplary display scheme of FIG. 12 presents the throttling-effectiveness summary 1210 and the throttling-rule-impact summary 1220. The data presented according to the display schemes of FIGS. 11 and 12 may include data generated by what-if simulators or models, which in turn may allow one to better understand how the software licenses are consumed.

It will be understood that the described system for auditing software usage by network device users can comprise any number of components or modules adapted to perform various functions or tasks. For example, with reference to FIG. 13, there is provided one embodiment of a software license auditing system wherein an auditing application on a network device 110 may collect information regarding the device 110 by checking hardware parameters expected to be unique to the network device environment. The auditing application may generate a device identifier based on the collected hardware information. In the alternative, or in addition, the auditing application may provide the collected hardware information to another device or server, which in turn may generate the hardware identifier.

The auditing application may collect or receive information regarding a given software on the network device 110, such as, for example, a software serial number. The auditing application may optionally collect or receive information regarding collects a geo-location code 140 of the device 110, such as, for example, the IP address for the device 110.

The auditing application may associate the software identifier with the hardware identifier and/or the geo-location code, and may provide such data to an auditing server 112. The auditing server 112 may receive such data from a plurality of network devices and store the received data in an audit database.

The auditing server 112 share the data in the audit database with a management device 150. The management device 150 may comprise a management application that selects a display scheme for presenting data in the audit database. The management application may automatically determine the appropriate display scheme, or may allow the management device user to select a display scheme from a menu or list. The management application may process and/or present at least a subset of the data in the audit database according to the selected display scheme.

Figure 13:
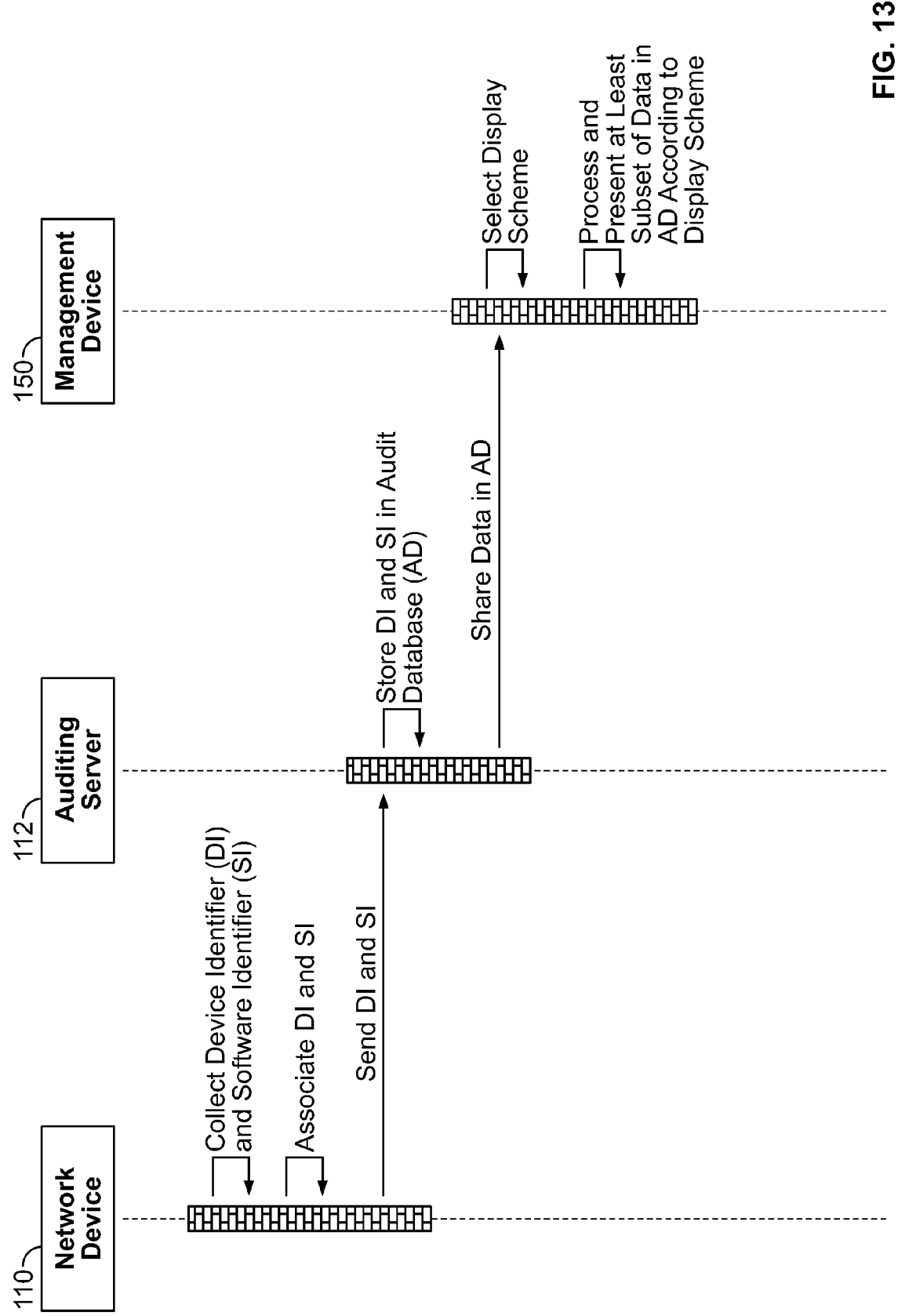
FIG. 13 is a sequence diagram for the system of FIG. 1A in accordance with an exemplary approach to auditing distributed software.
Figure 14:
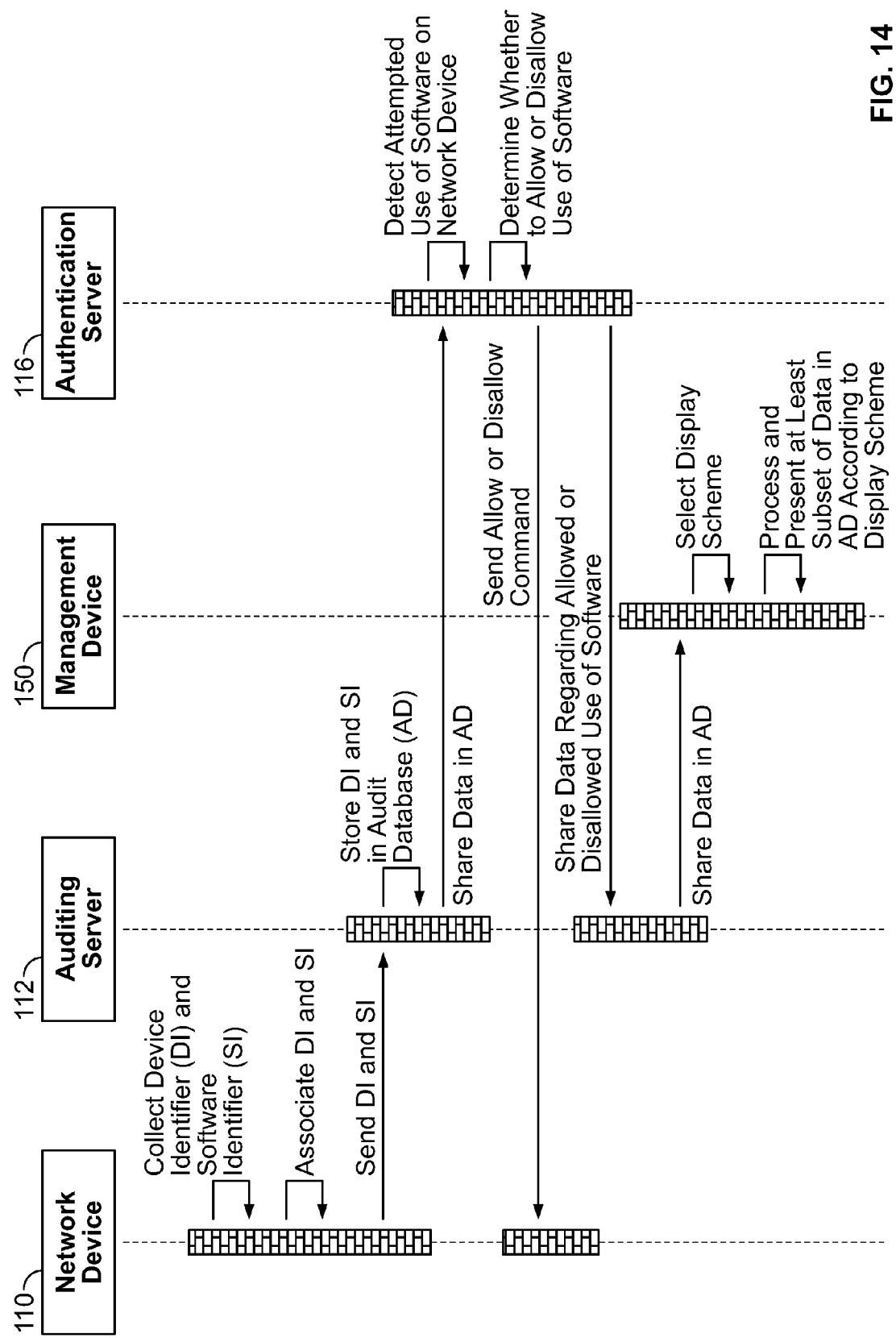
FIG. 14 is a sequence diagram for the system of FIG. 1B in accordance with another exemplary approach to auditing distributed software.

With reference to FIG. 14, there is provided another embodiment of an software license auditing system that is similar to the embodiment of FIG. 13, but further comprises an optional authentication server 116. The authentication server 116 may detect when a network device user is trying to run a given software on his/her network device. The authentication server 116 may receive/access and use the data in the audit database of the auditing server 112 to determine whether to allow the attempted use the given software. The authentication server 116 may further receive/access the license terms for a particular software from the auditing server 112 or another server or network device. In one approach, the server 116 may send a throttle or disallow use command to the network device if the number of currently allowed seats meets or exceeds the maximum number of allowed seats for the given software, which may be defined by the software license terms. In another approach, the server 116 may send a throttle or disallow command to the network device if software identifier for the given software is already associated with a different device identifier and/or a different IP address in the audit database. Otherwise, the server 116 may send an allowed use command to the network device to allow use of the given software.

In accordance with one or more aspects of the embodiments described herein, there are provided techniques for auditing licenses for software running on one or more network devices. In one embodiment, there is provided a network device comprising: a communication module for communicating with a server (e.g., audit database); at least one processor in operative communication with the communication module; and a memory in operative communication with the at least one processor and comprising executable code for the at least one processor to perform a number of steps. For example, the at least one processor may: collect machine parameters of the device, the collected machine parameters comprising a combination of at least one user-configurable parameter and at least one non-user-configurable parameter; generate a device identifier for the device based at least in part on the collected machine parameters; create an audit number based at least in part on the device identifier; and instruct the communication module to transmit the audit number to an audit database for storage.

In related aspects, the memory may comprise executable code for the at least one processor to: collect a software identifier of the software running on the device; and associate the software identifier with the device identifier to generate the audit number. The software identifier may comprise: a software serial number; information regarding a geographic region associated with the software; and/or information regarding at least one of a seller, a buyer, and a distributor of the software.

In further related aspects, the at least one processor may associate the software identifier with the device identifier by concatenating the software identifier with the device identifier. In the alternative, or in addition, the at least one processor may associate the software identifier with the device identifier by linking the software identifier with the device identifier.

In yet further related aspects, the at least one processor may: determine a geo-location code for the device; and associate the geo-location code with at least one of the software identifier and the device identifier to generate the audit number. The geo-location code comprises an Internet Protocol (IP) address of the device.

In other aspects, the at least one processor may generate the device identifier by implementing at least one irreversible transformation (e.g., a cryptographic hash function) such that the collected machine parameters cannot be derived from the device identifier.

In accordance with one or more aspects of the embodiments described herein, there is provided another embodiment of a network device adapted to facilitate auditing of a license for a software running on the device. The device may comprise: a communication module for communicating with an auditing server and an authentication server; at least one processor in operative communication with the communication module; and a memory in operative communication with the at least one processor and comprising executable code for the at least one processor to perform a number of tasks. For example, the at least one processor may: collect machine parameters of the device, the collected machine parameters comprising a combination of at least one user-configurable parameter and at least one non-user-configurable parameter; instruct the communication module to send the collected machine parameters to the auditing server to generate a device identifier for the device based at least in part on the collected machine parameters; in response to receiving the device identifier from the server, create an audit number based at least in part on the device identifier; and instruct the communication module to transmit the audit number to at least one of the auditing server and the authentication server for storage in at least one audit database.

In related aspects, the memory may further comprise executable code for the at least one processor to: collect a software identifier of the software running on the device; and associate the software identifier with the device identifier to generate the audit number.

In further related aspects, the memory may further comprise executable code for the at least one processor to: collect a software identifier of the software running on the network device; and instruct the communication module to send the software identifier to the auditing server to generate the device identifier based at least in part on the software identifier.

In other related aspects, the at least one processor may: determine a geo-location code (e.g., IP address) or the device; and associate the code with at least one of the device identifier and the software identifier to generate the audit number. In the alternative, or in addition, the at least one processor may: determine a geo-location code for the device; and instruct the communication module to send the code to the auditing server to generate the device identifier based at least in part on the code.

In accordance with one or more aspects of the embodiments described herein, there is provided a system for managing a license for a software running on one or more network devices, comprising: a communication module for accessing an audit database, the database comprising audit numbers for the one or more network devices, each audit number comprising a software identifier associated with a device identifier, each device identifier being generated from a combination of user-configurable and non-user-configurable machine parameters for a given network device; a display module; at least one processor in operative communication with the communication module, and the display module; and a memory in operative communication with the at least one processor and comprising executable code for the at least one processor. For example, the at least one processor may: instruct the communication module to access the database; process the audit numbers to sort the audit numbers according to at least one of activated license seats and unactivated license seats; select a display scheme for presenting the processed audit numbers; and instruct the display module to present the processed audit numbers according to the selected display scheme. The at lest one processor may select the display scheme in response to a user choice entered on a user input module in operative communication with the at least one processor.

In related aspects, the at least one processor may sort the audit numbers according to at least one of authorized software copies and pirated software copies. In the alternative, or in addition, the at least one processor may sort the audit numbers according to geographic data regarding the software.

In further related aspects, the at least one processor may identify a trend with respect to at least one of the activated license seats and the unactivated license seats. The at least one processor may identify a trend with respect to at least one of authorized software copies and pirated software copies. The at least one processor identifies a trend with respect to geographic data regarding the software. The at least one processor may instruct the display module to display the processed audit numbers as a piracy heat map or the like.

While the present invention has been illustrated and described with particularity in terms of preferred embodiments, it should be understood that no limitation of the scope of the invention is intended thereby. Features of any of the foregoing methods and devices may be substituted or added into the others, as will be apparent to those of skill in the art. It should also be understood that variations of the particular embodiments described herein incorporating the principles of the present invention will occur to those of ordinary skill in the art and yet be within the scope of the invention.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

It is understood that the specific order or hierarchy of steps in the processes disclosed herein in an example of exemplary approaches. Based upon design preferences, it is understood that the specific order or hierarchy of steps in the processes may be rearranged while remaining within the scope of the present disclosure The accompanying method claims present elements of the various steps in sample order, and are not meant to be limited to the specific order or hierarchy presented.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., Erasable Programmable Read Only Memory (EPROM), card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Those skilled in the art will further appreciate that the various illustrative logical blocks, modules, circuits, methods and algorithms described in connection with the examples disclosed herein may be implemented as electronic hardware, computer software, or combinations of both. To clearly illustrate this interchangeability of hardware and software, various illustrative components, blocks, modules, circuits, methods and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

What is claimed is:

1. A network device adapted to facilitate auditing of a license for a software running on the device, comprising:
   a communication module for communicating with a server, the communication module comprising at least one processor; and
   a memory in operative communication with the at least one processor and comprising executable code, that when executed by the communication module causes the module to perform the steps of:
      collecting machine parameters of the device, the collected machine parameters comprising a combination of at least one user-configurable parameter and at least one non-user-configurable parameter;
      generating a device identifier for the device based at least in part on the collected machine parameters;
      collecting a software identifier of the software running on the device;
      determining a geo-location code for the device;
      creating an audit number by associating the software identifier, the device identifier, and the geo-location code; and
      transmitting the audit number, using the communication module, to an audit database for storage.

2. The device of claim 1, wherein the software identifier comprises a software serial number.

3. The device of claim 1, wherein the software identifier comprises information regarding a geographic region associated with the software.

4. The device of claim 1, wherein the software identifier comprises information regarding a seller or a distributor of the software.

5. The device of claim 1, wherein the at least one processor associates the software identifier with the device identifier by concatenating the software identifier with the device identifier.

6. The device of claim 1, wherein the at least one processor associates the software identifier with the device identifier by linking the software identifier with the device identifier.

7. The device of claim 1, wherein the geo-location code comprises an Internet Protocol (IP) address of the device.

8. The device of claim 1, wherein the at least one processor generates the device identifier by implementing at least one irreversible transformation such that the collected machine parameters cannot be derived from the device identifier.

9. The device of claim 8, wherein the at least one irreversible transformation comprises a cryptographic hash function.

10. The device of claim 1, wherein the server comprises the audit database.

11. The device of claim 1, wherein the machine parameters comprise information regarding at least one of: machine model; machine serial number; machine copyright; machine ROM version; machine bus speed; machine details; machine manufacturer; machine ROM release date; machine ROM size; machine UUID; and machine service tag.

12. The device of claim 1, wherein the machine parameters comprise information regarding at least one of: CPU ID; CPU model; CPU details; CPU actual speed; CPU family; CPU manufacturer; CPU voltage; and CPU external clock.

13. The device of claim 1, wherein the machine parameters comprise information regarding at least one of: network model; network address; Bluetooth address; Blackbox model (including IDE and SCSI); Blackbox serial; Blackbox details; Blackbox damage map; Blackbox volume name; NetStore details; and NetStore volume name.

14. The device of claim 1, wherein the machine parameters comprise information regarding at least one of: optical model; optical serial; optical details; keyboard model; keyboard details; mouse model; mouse details; printer details; and scanner details.

15. The device of claim 1, wherein the machine parameters comprise information regarding at least one of: baseboard manufacturer; baseboard product name; baseboard version; baseboard serial number; and baseboard asset tag.

16. The device of claim 1, wherein the machine parameters comprise information regarding at least one of: chassis manufacturer; chassis type; chassis version; and chassis serial number.

17. The device of claim 1, wherein the machine parameters comprise information regarding at least one of: IDE controller; SATA controller; D controller; and SCSI controller.

18. The device of claim 1, wherein the machine parameters comprise information regarding at least one of: port connector designator; port connector type; port connector port type; and system slot type.

19. The device of claim 1, wherein the machine parameters comprise information regarding at least one of: cache level; cache size; cache max size; cache S type; and cache error correction type.

20. The device of claim 1, wherein the machine parameters comprise information regarding at least one of: fan; PCMCIA; modem; portable battery; tape drive; USB controller; and USB hub.

21. The device of claim 1, wherein the machine parameters comprise information regarding at least one of: device model; device model IMEI; device model IMSI; and device model LCD.

22. The device of claim 1, wherein the machine parameters comprise information regarding at least one of: wireless 802.11; webcam; game controller; silicone serial; and PCI controller.

23. A method for auditing a license for a software running on a network device, the method comprising the following steps:

collecting, by the network device, machine parameters of the device, the collected machine parameters comprising a combination of at least one user-configurable machine parameter and at least one non-user-configurable machine parameter;

generating, by the network device, a device identifier for the device based at least in part on the collected machine parameters;

collecting, by the network device, a software identifier of the software running on the device;

determining, by the network device, a geo-location code for the device;

creating, by the network device, an audit number by associating the software identifier, the device identifier, and the geo-location code; and transmitting, by the network device, the audit number to a server for storage in an audit database.

* * * * *